United States Patent
Stob

(10) Patent No.: US 10,491,599 B2
(45) Date of Patent: *Nov. 26, 2019

(54) METHOD AND SYSTEM FOR COMPILING MAP DATA

(71) Applicant: James A. Stob, St. Charles, IL (US)

(72) Inventor: James A. Stob, St. Charles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,629

(22) Filed: Jan. 24, 2018

(65) Prior Publication Data

US 2018/0152459 A1     May 31, 2018

Related U.S. Application Data

(63) Continuation of application No. 14/997,632, filed on Jan. 18, 2016, now Pat. No. 9,912,674, which is a
(Continued)

(51) Int. Cl.
*H04M 1/66* (2006.01)
*H04L 29/06* (2006.01)
(Continued)

(52) U.S. Cl.
CPC .......... *H04L 63/105* (2013.01); *H04L 63/083* (2013.01); *H04W 4/029* (2018.02); *H04W 12/06* (2013.01); *H04W 12/08* (2013.01)

(58) Field of Classification Search
CPC ......... H04W 4/02; H04W 4/025; H04W 4/04; H04W 12/06; H04W 12/08; H04W 4/029; H04L 29/06; H04L 63/105; H04L 63/083
(Continued)

(56) References Cited

U.S. PATENT DOCUMENTS 6,381,603 B1    4/2002  Chan et al.
7,346,519 B2 *  3/2008  Carr .................. G06Q 30/06
                                                      705/26.1
(Continued)

FOREIGN PATENT DOCUMENTS

KR      100882025       1/2009
KR      20110069993     6/2011

OTHER PUBLICATIONS

Shiue, Yu-Chi et al, "A Study of Geographic Information System Combining with GPS and 3G for Parking Guidance and Information System," World Academy of Science, Engineering and Technology. 2010, p. 418-424.
(Continued)

*Primary Examiner* — Mahendra R Patel
(74) *Attorney, Agent, or Firm* — Belles Katz LLC

(57) ABSTRACT

In one embodiment, a method of compiling map data is disclosed. The method includes a server receiving an authorization request from a remote programmable device, the authorization request including user authentication information. The server compares the authorization request with authorization data to determine a user authorization level. The server receives from the device first geocoordinates, a first property location identifier, and a first location description. A property authorization level includes at least three different levels of access. When the user authorization level matches or exceeds the property authorization level, the server incorporates one or more of the first geocoordinates, the first property location identifier, and the first location description into a database comprising a plurality of geocoordinates.

20 Claims, 10 Drawing Sheets

Related U.S. Application Data continuation of application No. PCT/US2014/047253, filed on Jul. 18, 2014, which is a continuation of application No. 13/946,599, filed on Jul. 19, 2013, now abandoned.

(51) Int. Cl.
*H04W 4/029* (2018.01)
*H04W 12/08* (2009.01)
*H04W 12/06* (2009.01)

(58) Field of Classification Search
USPC .............. 455/411, 456.3, 404.1; 340/539.13; 709/206, 225, 220
See application file for complete search history.

(56) References Cited

U.S. PATENT DOCUMENTS

| | | |
|---|---|---|
| 7,414,988 B2 | 8/2008 | Jones et al. |
| 7,548,198 B2 | 6/2009 | Mergen |
| 7,881,948 B2 | 2/2011 | Carr et al. |
| 8,056,206 B2 | 11/2011 | Jones et al. |
| 8,149,113 B2 | 4/2012 | Diem |
| 8,156,206 B2 | 4/2012 | Kiley et al. |
| 8,171,237 B2 | 5/2012 | Naaman et al. |
| 8,175,794 B1* | 5/2012 | Szybalski ............. G06Q 50/16 701/454 |
| 8,271,431 B1* | 9/2012 | Carrington ............ G06Q 10/10 707/603 |
| 8,630,991 B2 | 1/2014 | Rao |
| 8,751,816 B2 | 6/2014 | Simski et al. |
| 2004/0030702 A1* | 2/2004 | Houston ............... G06F 21/604 |
| 2004/0044766 A1* | 3/2004 | Pauly ................... G06F 16/258 709/225 |
| 2005/0068159 A1 | 3/2005 | Hung |
| 2005/0245271 A1 | 11/2005 | Vesuna |
| 2008/0060061 A1 | 3/2008 | Deshpande et al. |
| 2008/0178300 A1 | 7/2008 | Brown et al. |
| 2008/0297409 A1 | 12/2008 | Klassen et al. |
| 2009/0222432 A1 | 9/2009 | Ratnakar |
| 2009/0222482 A1 | 9/2009 | Klassen et al. |
| 2010/0069035 A1* | 3/2010 | Johnson ................ H04W 92/18 455/404.1 |
| 2010/0076968 A1 | 3/2010 | Boyns et al. |
| 2010/0094548 A1* | 4/2010 | Tadman ................. G01C 21/36 701/533 |
| 2011/0208425 A1 | 8/2011 | Zheng et al. |
| 2011/0289161 A1* | 11/2011 | Rankin, Jr. .......... G06Q 10/107 709/206 |
| 2012/0151210 A1 | 6/2012 | Perez |
| 2012/0190386 A1* | 7/2012 | Anderson ............. G01C 15/04 455/456.3 |
| 2012/0215446 A1 | 8/2012 | Schunder et al. |
| 2012/0254156 A1* | 10/2012 | Rao ....................... G06Q 10/10 707/722 |

OTHER PUBLICATIONS

Bouvin, Niels Olof et al, "HyCon: a framework for contextaware mobile hypermedia," New Review of Hypermedia and Multimedia, 2003, p. 59-88, vol. 9.

Lee, Tae-Hoon et al, "Keyword-based Semantic Retrieval System using Location Information in a Mobile Environment," Proceedings of the 2009 International Symposium on Web Information Systems and Applications, May 22-24, 2009, p. 434-438, CN.

Goodchild, Michael F., "Citizens as sensors: the world of volunteered geography," GeoJournal, 2007, p. 211-221, vol. 69.

Viana, Windson et al, "PhotoMap: From Location and Time to Context-Aware Photo Annotations," FR.

Corresponding International Search Report and Written Opinion for PCT/US14/47253 dated Dec. 5, 2014. WO.

* cited by examiner

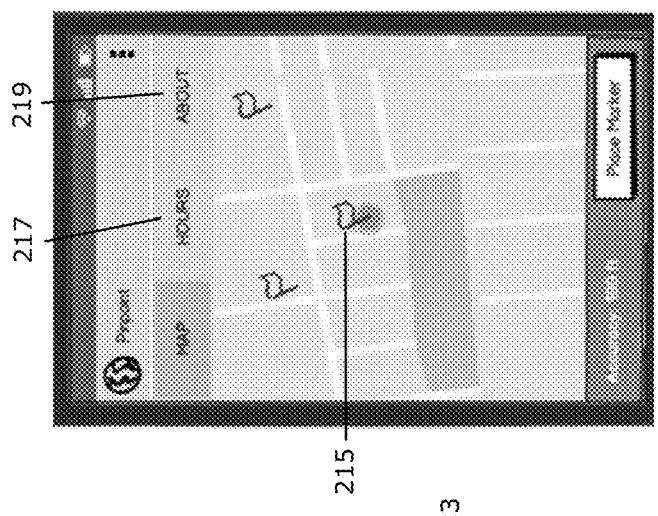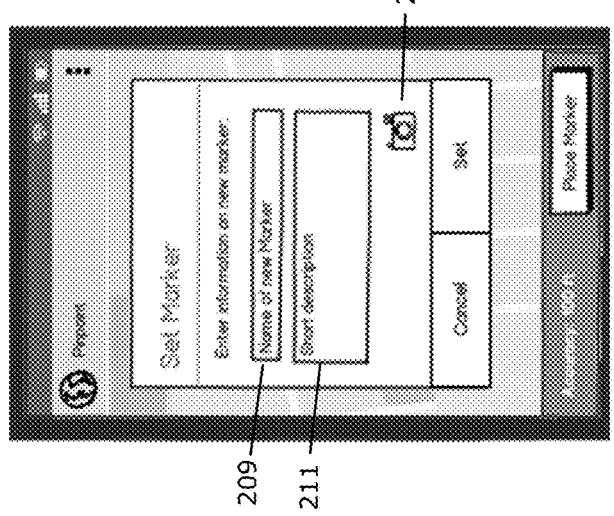
Fig. 9C
Fig. 9B
Fig. 9A

METHOD AND SYSTEM FOR COMPILING MAP DATA

CROSS-REFERENCE TO RELATED APPLICATIONS

The present application is a continuation of U.S. patent application Ser. No. 14/997,632, filed Jan. 18, 2016, which is a continuation of PCT Application No. PCT/US2014/047253, filed Jul. 18, 2014, which claims priority to U.S. patent application Ser. No. 13/946,599 (now abandoned), filed Jul. 19, 2013. The disclosures of the aforementioned priority applications are incorporated herein by reference in their entireties.

FIELD OF THE INVENTION

The field of the present invention relates to methods and systems for collecting and compiling geocoordinates and associated information into a map database.

BACKGROUND OF THE INVENTION

Portable computing devices, in the form of smart phones, tablets, laptop computers, GPS navigation devices, have become ubiquitous over the last several years. The users of these devices, especially the smart phones and GPS navigation units, frequently use the devices to call up maps for directions, to locate a business, a home, or a geographical location. Presently, map data may include geocodes for identifying points-of-interest, geocodes for identifying "route to" points to which routing directions cross or terminate, and it may include other, non-geocode data associated with the points-of-interest.

The map data available to portable devices were initially limited to geocodes identifying streets, from which driving directions could be generated. As the technology area has grown, some off-the-street data has been included from which walking directions and public transportation directions could be derived. The data used for walking directions typically enables routes to be generated over public paths that are constructed strictly for pedestrians. The data used for public transportation directions typically enables the use of bus routes and train routes, both of which are publicly accessible.

The non-geocode data associated with the points-of-interest generally takes the form of street addresses, businesses, phone numbers, and the like. This data is not always accurate, and it is often still not accurate in present-day databases. This is often because of the way in which it is generated. For example, a street address may be associated with a geocode point-of-interest by an individual reviewing a satellite image and taking their best, educated guess at which geocode should be associated with which point-of-interest.

Much of the map data, until recently, has been centrally collected and compiled by the entities making it available for use on the portable devices, with the result being that most data is collected from publicly accessible geographical areas and property. Another issue with map data that is centrally collected is, with all the roads in a city, region, or state, the entities performing the collecting cannot keep up with the pace of changes to keep the map data up to date.

Crowd sourced map data is also presently compiled through Internet portal sites such as Wikimapia.org, and it can be useful in keeping map data up to date. However, since map data is relied upon by so many within society, and for so many different purposes, collecting map data from the general public raises concerns about reliability.

SUMMARY OF THE INVENTION

The present invention is directed toward a system and method for compiling map data into a database. A server is configured to maintain a database of at least a plurality of geocoordinates and to add additional data to the database, the additional data being in the form of one or more of additional geocoordinates, property location identifiers, and location descriptions. The data collected in the database may be accessed through queries directed to the server.

In one aspect of the present invention, a method of compiling map data includes communicating, using a server, with a remote programmable device operable by a user; receiving, at the server and from the device, an authorization request including user authentication information; comparing, by the server, the authorization request received from the device with authorization data to determine a user authorization level based on the user authentication information; receiving, at the server and from the device, first geocoordinates, a first property location identifier, and a first location description, wherein the first geocoordinates locate a geoposition on or near a property identified by the first property location identifier; and incorporating, by the server, one or more of the first geocoordinates, the first property location identifier, and the first location description into a database comprising a plurality of geocoordinates, when the determined user authorization level matches or exceeds a property authorization level, wherein the property authorization level includes at least three different levels of access.

In another aspect of the present invention, a network includes a remote programmable device for operation by a user; and at least one server configured to execute non-transitory computer executable code, the code instructing the server to receive from the device an authorization request including user authentication information; compare, by the server, the authorization request received from the device with authorization data maintained by the server to determine a user authorization level based on the user authentication information; receive from the device first geocoordinates, a first property location identifier, and a first location description, wherein the first geocoordinates locate a geoposition on or near a property identified by the first property location identifier; and incorporate one or more of the first geocoordinates, the first property location identifier, and the first location description into a database comprising a plurality of geocoordinates, when the determined user authorization level matches or exceeds a property authorization level, wherein the property authorization level includes at least three different levels of access.

In another aspect of the present invention, a method of compiling map data includes communicating, using a server, with a remote programmable device operable by a user; receiving, at the server and from the device, an authorization request including user authentication information; determining, at the server, a user authorization level based on the user authentication information; receiving, at the server and from the device, first geocoordinates, a first property location identifier, and a first location description, wherein the first geocoordinates locate a geoposition on or near a property identified by the first property location identifier; and incorporating, by the server, one or more of the first geocoordinates, the first property location identifier, and the first location description into a database comprising a plurality of geocoordinates, when the determined user authorization level matches or exceeds a property authorization level, wherein the property authorization level includes at least three different levels of access.

In another aspect of the present invention, any of the foregoing aspects may be employed in combination.

Accordingly, an improved system and method for compiling map data are disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIGS. 9A-E illustrate forms for collecting map data.

DETAILED DESCRIPTION OF THE INVENTION

Figure 1:
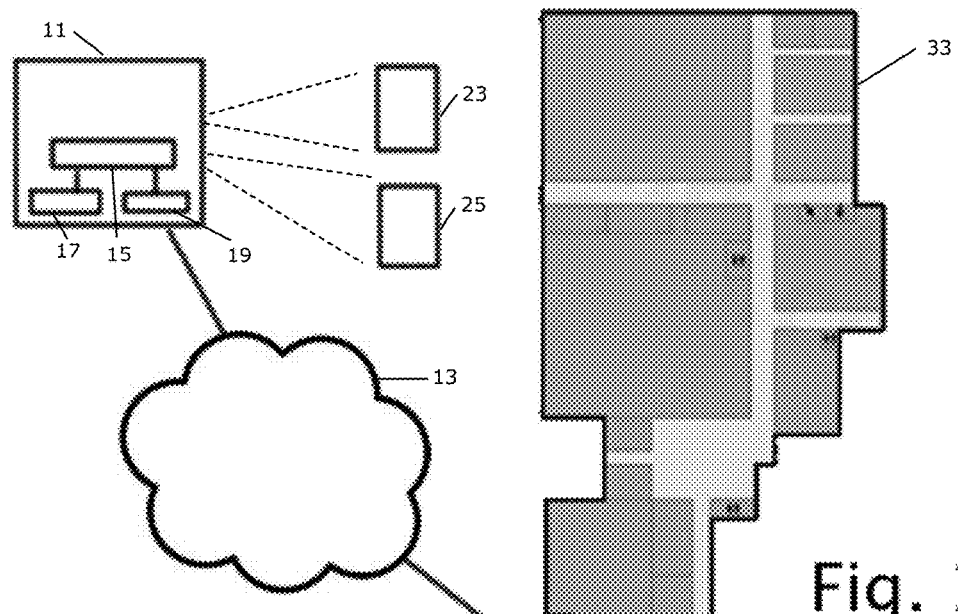
FIG. 1 schematically illustrates a system for compiling map data, being used in connection with generating map data for a hotel casino.
Figure 1:
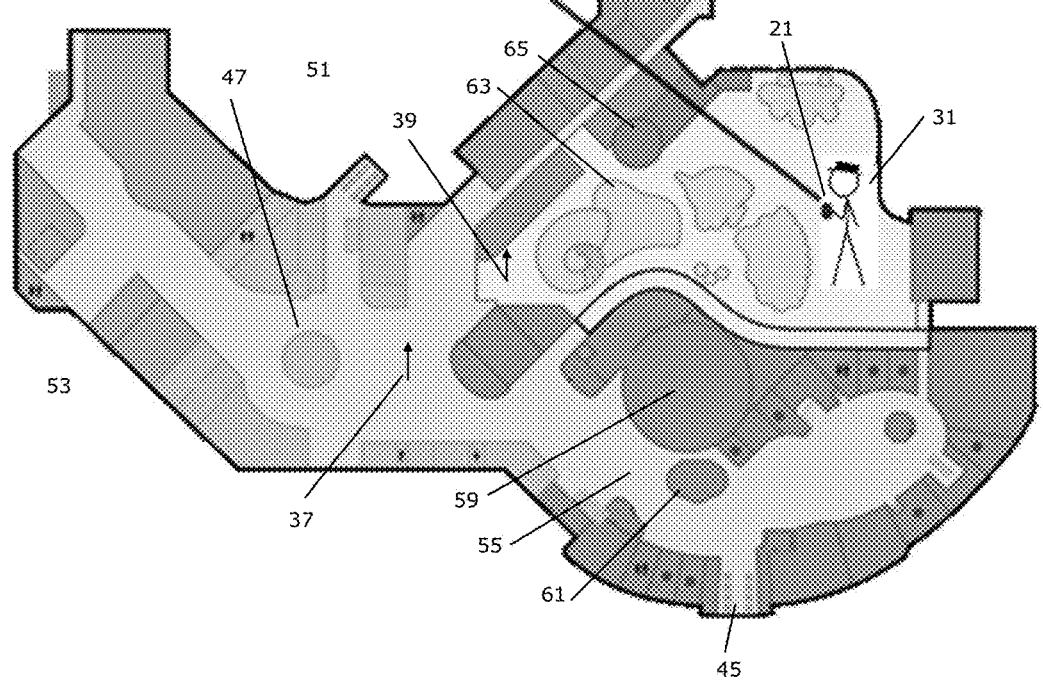

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g. code). Various processors may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs is referred to hereinafter as a "programmable device", or just a "device" for short, and multiple programmable devices in mutual communication is referred to as a "programmable system". It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

A system for compiling map data is illustrated in FIG. 1. The system includes a server 11 which operates in a networked environment to interact with other programmable devices and networks. The network environment may include and operate over a public network such as the Internet 13, over a private network, or any combination of public and private networks. The networks themselves may be wired networks, wireless networks, or any combination of wired and wireless networks. The server in the embodiment shown includes a processor 15, a volatile memory 17, and a non-volatile storage device 19. Additional processors, volatile memory spaces, and non-volatile storage devices may be included as desired based on specifications of a particular implementation.

In the embodiment illustrated, the server 11 is networked using the Internet 13, which serves as a public network, to a programmable device 21. Although the server may be networked to multiple programmable devices simultaneously, only one is shown for purposes of simplifying the ensuing description. The programmable device 21 serves as a point of data acquisition for the database or databases maintained by the server 11. The programmable device may be any type of computing device, although it is preferably one that is configured to be a mobile device, such as a laptop, notebook, tablet, cellular phone, and the like. The server 11 may use any desired protocols and file formats to electronically communicate with the programmable device that is deemed appropriate for the specifications of a particular implementation.

The server 11 interacts with the programmable device 21 to gather and compile information into the map database 23 and the and into the authorization database 25 maintained by the server. To this end, the server 11 is programmed to perform the data gathering, data compilation, and database functionality that is described in further detail below. The server may also be programmed to distribute data from the database to other servers or programmable devices using one or more application program interface (API), although such functionality is beyond the scope of the present disclosure. Those of skill in the art will recognize that the map database 23 may be maintained as a single, integrated database, or it may be maintained as two or more relational databases. Likewise, the authorization database may be maintained as a separate database, as shown, or it may be integrated as part of the map database. For purposes of the description below, the map database is treated as being separate from the authorization database.

In performing data gathering and compilation, the server 11 is programmed to communicate with the programmable device 21 as appropriate to gather designated data for insertion into the databases 23, 25. Typically, the mobile programmable device 21 will initiate communication with the server 11 to provide data for the databases 23, 25. The server 11 may, at times, also initiate communications with the programmable device 21 in order to gather or verify data for the databases.

The data communicated from the programmable device 21 to the server 11 is generally one of three data types: 1) geocoordinates, which locate a geoposition on or near a property, 2) a property location identifier associated with the geocoordinates, and 3) a location description, also associated with the geocoordinates. Of course, other data and data types may also be communicated. The geocoordinates may be generated by any method available to the particular mobile programmable device, and they may be directly generated or generated as part of another process of the mobile programmable device, such as when a mobile programmable device is used to take a photograph and geocoordinates are embedded in the photograph. In this latter case, the photograph itself may be transmitted to the server, with the server being programmed to extract the geocoordinates from the photograph, and the server may be further programmed to incorporate the photograph into the location description. Commonly known methods for producing geocoordinates, and thereby locating a geoposition, with a mobile programmable device include the use of triangulation, and such methods may include using a Global Positioning System (GPS) system built into the device, and for programmable devices which connect to a cellular telephone network, triangulating between base towers. In addition to generating geocoordinates, these triangulation methods may also provide an error estimate associated with the geocoordinates, and this error estimate may be included as part of the geocoordinates data communicated by the programmable device 21 to the server 11. The processes for producing such error estimates from GPS systems and cell tower triangulation are also commonly known. Other methods may also be used for obtaining geocoordinates, such as Wi-Fi location and position tracking using an internal accelerometer and compass, among others. Although there are several options available to obtain geocoordinates, the remainder of the description below, for purposes of clarity, discusses the obtaining of geocoordinates in terms of triangulation.

The property location identifier is a non-geocoordinates identifier for the property, such as a street address, a parcel number, and the like. The property location identifier is generally associated with geocoordinates presently obtained by the programmable device, and the property location identifier may be entered manually by the user, or it may be obtained by the programmable device, or by the server, by querying other sources. In general, most map databases already include substantially complete listings of property location identifiers for all properties on record with local governments. However, even though a comparison of different map databases reveals that the geocoordinates associated with a particular property can vary widely (a problem which the systems and methods disclosed herein may be used to rectify), the programmable device or the server may be programmed to access data from those different map databases in order to present a list of property location identifiers to the user of the programmable device, from which the user may select the property location identifier intended to be associated with presently obtained geocoordinates.

As is discussed in more detail below, a substantial match between the geocoordinates and the property location identifier increases the known reliability of the data being submitted to the server, for incorporation into the database, by the programmable device and the user. The substantial match may be at least within the error estimate of the geocoordinates, or it may be within a multiplier factor of the error estimate, such as a 2× or 3× multiplier factor (or more, depending upon the contextual circumstances, such as the number of nearby properties, the size of the property selected, and the like), to be determined by the server as being reliable.

The location description may be any information the user of the programmable device wishes to associate with specific geocoordinates on the property and/or the property itself. Multiple types of data may be included in the location description and associated with any one set of geocoordinates, and multiple geocoordinates may be associated with any one property identifier. The type of information that is included in the location description may vary depending upon the user submitting the information, the property itself, the location of the property, the location of the specific geocoordinates on the property, and the use of the property (home, business, other), among other things. The location information may also include the type of business on the property, along with the types of goods and/or services offered for sale, and a myriad of other information, limited only by the imagination of the user submitting the information and, possibly, the authorization level associated with one or both of the user and the property. There may also be several businesses located on the same property, each associated with its own geocoordinates or sets of geocoordinates, each of which in turn has associated information, the combination of which aids the visitor in locating a specific business, service, and/or product, even when the building includes multiple levels where businesses are located (e.g., a mall). The information may even be a data file, such as a photograph, a brochure, a menu, or anything at all that a business or property owner wishes to have associated with the property and/or the business operated on the property. For some properties, visitors may be permitted to submit a location description (but not change the geocoordinates), and the description may take the form of a review of goods or services provided at a business, such as a restaurant, a personal care business, an auto repair shop, and the like.

Figure 2:
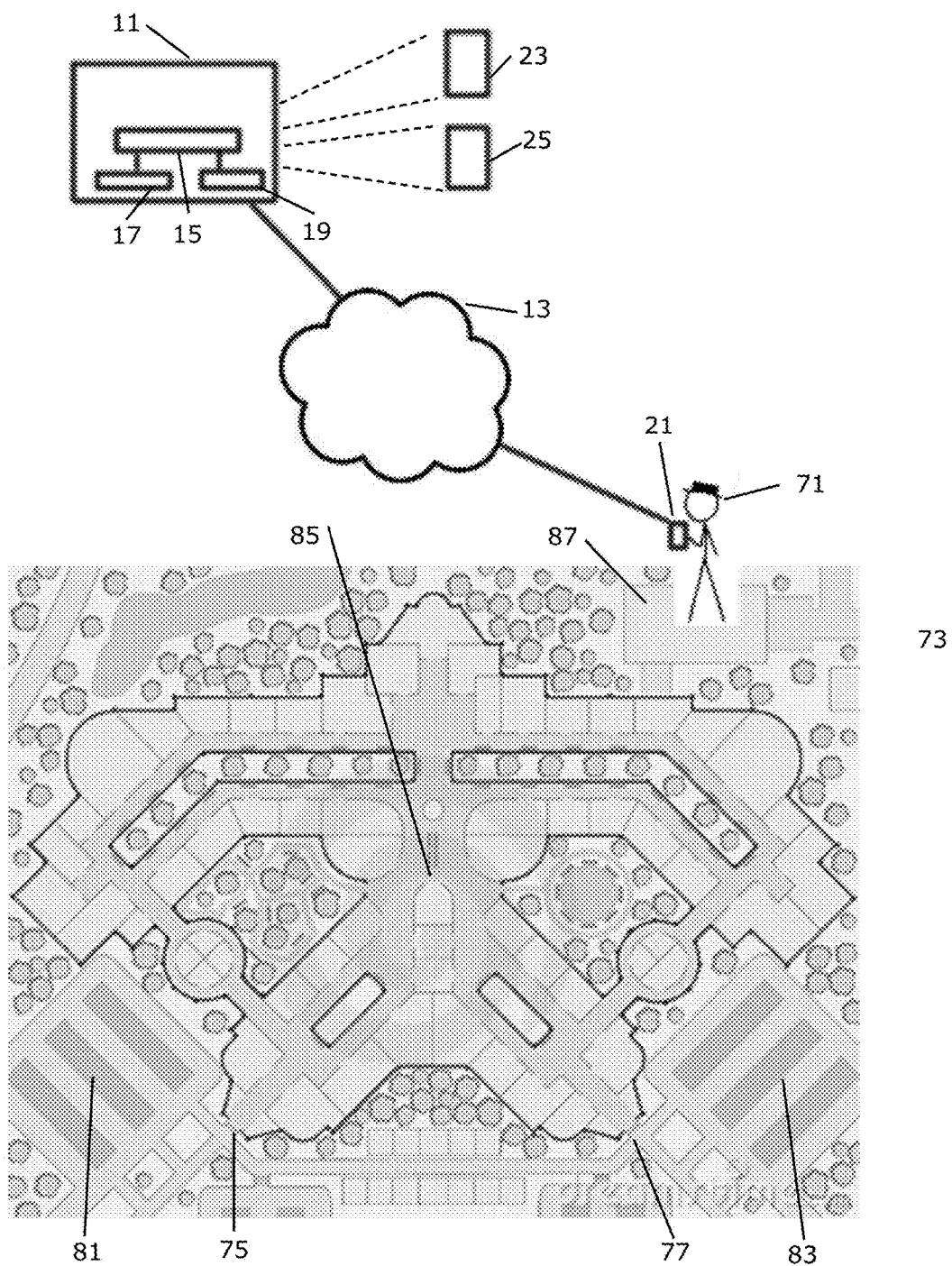
FIG. 2. schematically illustrates a system for compiling map data, being used in connection with generating map data for a shopping mall.

FIGS. 1 and 2 are examples of the types of things a property owner and/or a business owner on a property may wish to identify with specific geocoordinates having particularized information associated therewith. By having multiple geocoordinates included in the database for a particular property or business, and the different types of information associated with each geocoordinates, the property owner and/or the business owner may better enable visitors to navigate the property and locate the specific goods, services, or property features that visitors may find of interest. By way of example, the geocoordinates for a particular property may mark the location of one or more buildings on the property, the locations of boundaries of the property, building entrances, building emergency exits, real property fixtures visitors would find of interest.

FIG. 1 depicts a user 31 on the property 33 of a hotel & casino. This user 31 may want to first mark and identify the geocoordinates for the property itself as a 'Point-of-Interest' (POI) 37, which is generally the location shown on a map when a search is performed by people and/or devices attempting to locate the property, regardless of how the search is performed. Such a search could be performed by address, by business or occupant name, by services or goods offered, or just about any other data associated with the property. As will be seen from the description below, one of the benefits of the systems and methods described herein is the ability to increase the amount of data in the database that is associated with individual properties, and increase the data in a very useful and organized manner. The POI 37 geocoordinates may be located anywhere on the property the user desires, with the assumption is that the user wants to help the public better locate the property and any businesses on the property, including at the center of the main building 39, at the center of the property (not shown), or at the center of the parking lot (not shown). For instances when the POI 37 is located at the center of the main building 39 or at the center of the parking lot, the location description associated with the geocoordinates may indicate that those geocoordinates represent both the POI 37 and the center of the main building 39 or the center of the parking lot, as appropriate. Other locations the user 31 may want to mark with geocoordinates and an appropriate location description include the main entrance 45 to the main building 39, and within the main building the location of the hotel lobby 47, the reception desk 49, the stairs 51, the elevators 53 to the rooms, the casino area 55, the restaurant 59, the bar 61, and any other feature of interest within the main building 39. Also on the property, the user 31 may want to mark with geocoordinates and an appropriate location description the pool 63, the pool bar 65, and any other features of the property that may be of interest to guests.

As indicated, the geocoordinates identified as the POI 37 assist guests to the property 33 of the hotel & casino to arrive at their intended destination, whether traveling by car, public transportation, or on foot. Once on the property, the various other geocoordinates associated with the property, which have been previously incorporated into the database along with the associated location descriptions, aid guests in finding their way around the property. The implementation of the use of the geocoordinates and associated location descriptions for providing directions to guests is beyond the scope of compiling reliable data into a useable database. However, programming a mobile device to provide such functionality is well within the capabilities of one of ordinary skill in the art, once the reliable data, in the form of geocoordinates, location descriptions and property identifiers, is made available from the database by returning query results in response to a database query.

FIG. 2 depicts a user 71 on the property 73 of a mall, where the various stores and other interesting features of the mall may be identified by geocoordinates and associated location descriptions. For this property, the user 71 may want to mark and identify the main entrances 75, 77, both parking lots 81, 83, the food court 85, and the children's play area 87, among other parts of the mall. The user 71 may also want to mark and identify the location where specific brand name goods are sold, and where they are at on the sales floor of a particular store. There is no limit to the types of things for which the user may want to mark with geocoordinates and identify locations.

Although a single level mall is shown, multi-level malls might mark and identify store locations on each level, stairs, elevators, and escalators so that the database includes geocoordinates and associated location descriptions for every store and feature on every level. For property on which multiple businesses are located, the server may treat each individual business location as a separate property, i.e., each business may have its own unique property location identifier. Treating each individual business location as a separate property is preferred, as doing so best allows each business independent access and control over the geocoordinates and the location descriptions included in the database. Alternatively, the location description for the geocoordinates marking and identifying each separate business may include a notation that multiple businesses are located on the same property, and therefore associated with the same property location identifier. The scheme used is a matter of design choice, and it may vary from property to property, depending upon whether one or the other scheme is more appropriate for a particular property, from the view of a property and/or business owner, or from the view of an administrator of the server and systems.

Figure 3:
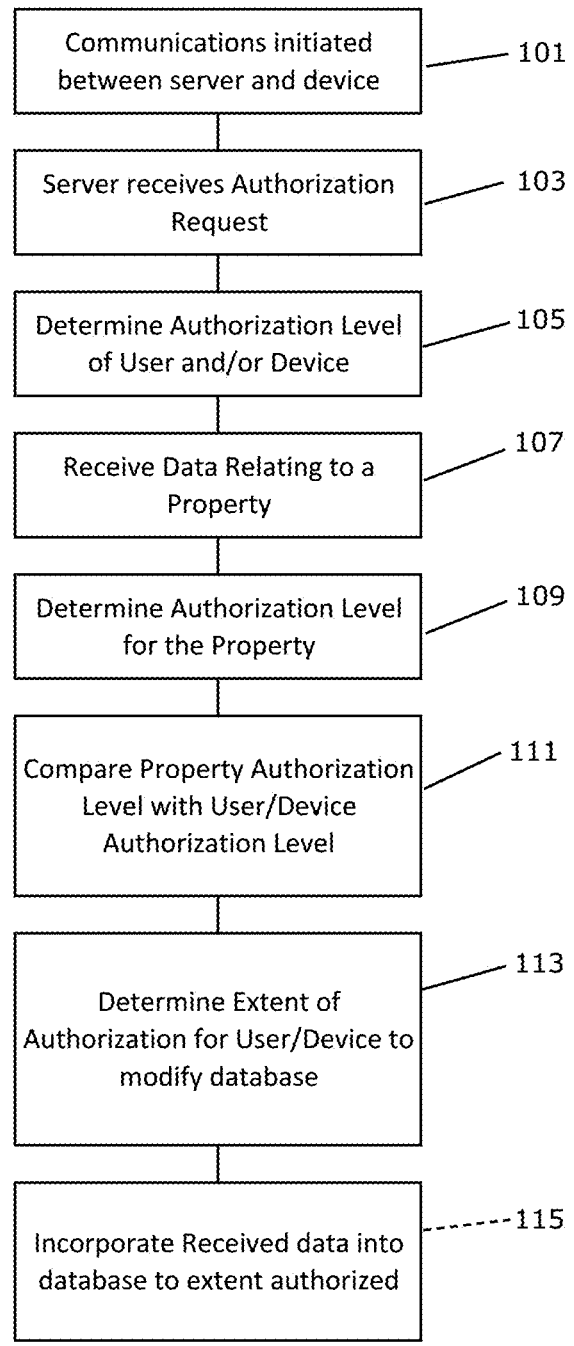
FIG. 3 is a flow chart showing a process for compiling map data.

The process of acquiring data for compilation into the database is shown in the flowchart of FIG. 3. For each of the steps described below, the server and the programmable device are each programmed to perform the functions described for each respective component. Initially, the server and the programmable device establish communications 101 with each other over a network using any appropriate communications protocol, which is a matter of design choice. With communications established, the server receives an authorization request from the device 103. This authorization request may be in the form of the user of the programmable device providing a user name and password through the interface on the programmable device, with the user name and password being included as part of the authorization request as login information so that the server is able to authenticate the user. The authorization request may also be in the form of the programmable device providing a unique identification number, such as a serial number, phone number, MAC address, or any other unique identifier associated with the programmable device, with this unique identifier being provided in the authorization request to authenticate the programmable device. As another alternative, the authorization request may include both a user name and password in addition to a unique identifier for the mobile device. With both supplied, the server may grant authorization based on either the user's authorization level or on the authorization level for the device, depending upon which provides the greater level of access for the property for which the user is submitting data for incorporation into the database.

After the server receives the authorization request, the server then uses the information supplied in the authorization request to determine the authorization level 105 of either the user, the programmable device, or both, depending upon the information included in the authorization request. The server maintains authorization data on users and programmable devices which have been given access to the map database, or which have previously accessed the map database. For each type of data stored in the map database, i.e., the geocoordinates, the property location identifier, and the location description, along with any other type of data included in the map database, the user and/or programmable device may be assigned to or associated with a user authorization level. And, data included in the location description may be divided up into sub-types so that different sub-types may be assigned to or associated with a different user authorization level as compared to other sub-types of data within the location description.

Each user authorization level helps provide fine-grained access control for all users and programmable devices accessing the server. By way of examples, an administrative user authorization level may provide an administrative user or an administrative programmable device with permission to access or modify data of all data types. Another user authorization level may provide a user or a programmable device with permission to access or modify data of the geocoordinates data type and of the location description data type, but not of the property location identifier data types. Yet another user authorization level may provide a user or a programmable device with permission to access or modify data of the location description data type, but not of any other data type. Still yet another user authorization level may provide a user or a programmable device with permission to access data of the location description data type, but not to modify that data and not to have access to any other data. Still yet another user authorization level may deny a user or a programmable device permission to access or modify any data type. As many different user authorization levels may be created as there are different combinations of data types plus accounting for accessing and modifying those data types, although not all different possibilities of user authorization levels are expected to be useful within the marketplace for a particular implementation.

For ease of maintaining the authorization data, different user authorization levels may include one or more groups of users or programmable devices, with each group including at least one user or programmable device. Thus, when a user or programmable device is added to a group, that user or programmable device is also added to the user authorization level associated with that group. Similarly, the user authorization level that a group is associated with may be changed, thereby changing the user authorization level for all users and programmable devices within that group. A user or programmable device need only be assigned to a single user authorization level (or to a single group), as the interaction between user authorization levels and property authorization levels is expected to provide a sufficient amount of fine grained control over which users and programmable devices have access to the map database, and the nature of that access, to make assignment of a single user authorization level sufficient for most purposes. In some implementations, however, it may be desirable to have users or programmable devices associated with multiple groups.

With the user authorization level determined, the server is ready to receive data 107 from the programmable device that relates to a property. In some embodiments, the server may receive the data before determining the authorization level of the user or programmable device from which the data is originating. From the received data, the server identifies the particular property to which the data relates (or at least the asserted relation, according to the user and/or programmable device), and then the server may determine the authorization level for the property 109. The property authorization level identifies which users, programmable devices, groups of users, and/or groups of programmable devices have permission to access and/or modify information in the map database related to a particular property, i.e., the geocoordinates, the property location identifier, and the location description, along with any other type of data included in the map database. And, the location description may be divided up into sub-types so that different sub-types may be assigned to or associated with a different property authorization level as compared to other sub-types of data within the location description.

Each property authorization level helps provide fine-grained access control to determine which users and programmable devices, when accessing the server, have the ability to access and/or modify data associated with a particular property. Every property included in the map database, and thus every property location identifier, has an associated property authorization level. For each data type, and sub-types, if included, in the database for a particular property, the property authorization level identifies at least one of a user, a programmable device, a group of users, a group of programmable devices, and a null set, and for all but the null set, the property authorization level identifies the level of access the user, a programmable device, group of users, and/or group of programmable devices has to data of that data type, that is no access, access to read only, or access to read and modify. There may be as many different variations in property authorization levels for different properties as there are different users, programmable devices, groups, and properties included in the database; in other words, the property authorization level for a particular property may be entirely unique to that property.

In the case where a property authorization level does not include information for a particular data type, i.e., the null set, the level of access may be determined by the user authorization level, or alternatively it may be interpreted as no access. Other default interpretations may be programmed into the server for instances where no information is included for a particular data type, depending upon desired design and implementation considerations. Letting the user authorization level control when the property authorization level is null may be most advantageous for instances when information about a new property, or information about a business on a recently developed property, is added to the database. In this case, users and/or programmable devices with an appropriate user authorization level may begin submitting data to the server for incorporation into the database without a need for initial administrative oversight.

By way of a few examples, a property authorization level may provide administrative users or administrative programmable devices with permission to access and modify all data types associated with that particular property, and deny modification permissions, while providing access permissions, to all other users for all data types. Another property authorization level may provide administrative users or administrative programmable devices with permission to access and modify all data types associated with that particular property, provide a particular user and/or a particular programmable device with permission to access and modify all data types except the property location identifier, and provide access only permissions to all other users for all data types. Yet another property authorization level may provide administrative users with permission to access and modify all data types associated with that particular property, provide a particular programmable device with permission to access and modify all data types except the property location identifier, and provide access and modification permissions to all other users for one sub-type of location description data; all other users would be denied access and modification permissions for all other data types.

With both the user and/or programmable device authorization level determined and the property authorization level determined, the two authorization levels are compared 111 so that the server may then determine the extent of authorization 113 for the particular user and/or programmable device to access and/or modify information in the data base associated with the particular property. To the extent that the user's and/or programmable device's user authorization level meets or exceeds the property authorization level, then the received information, to the extent it is authorized, is incorporated into the map database 115.

With the user authentication levels and property authentication levels set in this manner, giving fine grained control over the users and/or programmable devices that are able to access and/or modify the data, the map database has many other uses than just data to provide directions. For example, the map database may be used for public reviews of goods and/or services offered by businesses, with the review information being incorporated into the location description. In such a use, the presence of the customer may be verified by receiving the geocoordinates of the customer while present on the property of the business, thus providing strong indicia that the review is in fact a review submitted by a customer, instead of being a review by someone who is paid to write reviews and who never visited the business. Alternatively, the customer may be able to obtain the geocoordinates while present at the business, and then be given a short time-frame, for example from 30 minutes to 2 hours, in which to complete and submit the review. Again, having the geocoordinates obtained while present at the business serves as indicia of authenticity of the review, and one that is more difficult to fake or simulate by paid-for reviewers.

Figure 4:
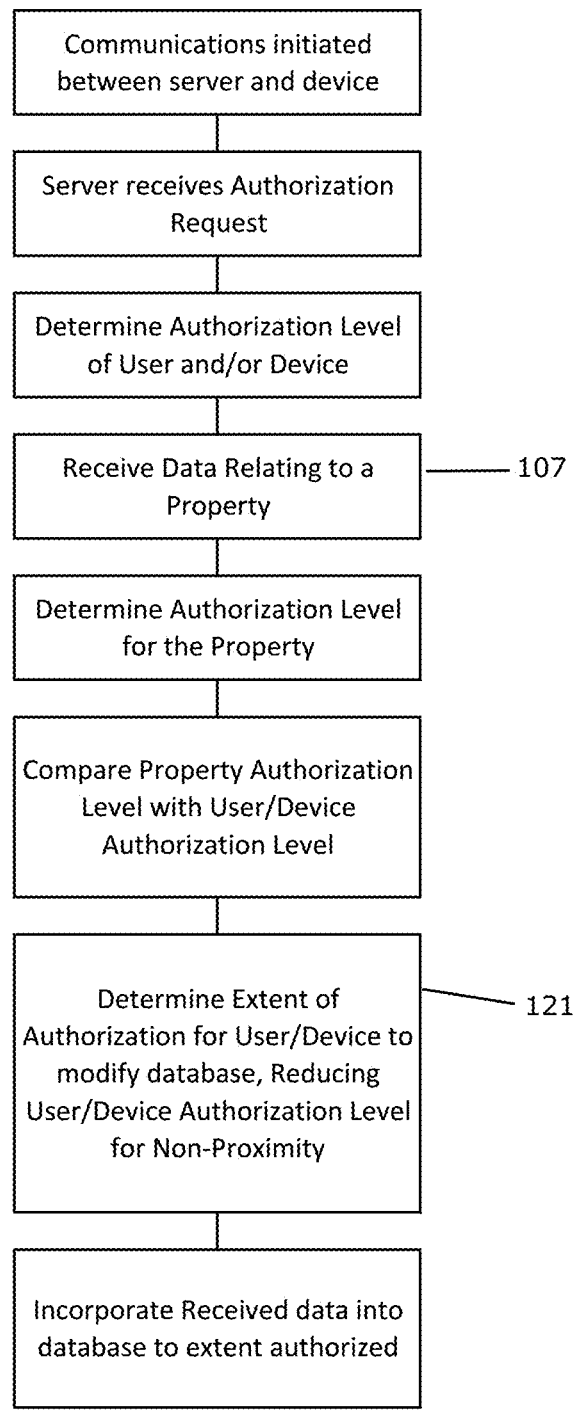
FIG. 4 is a flow chart showing an alternative process for compiling map data.

The process shown in the flow chart of FIG. 4 is a variation on that shown in FIG. 3, the difference being that in determining the extent of authorization for the user and or the programmable device 121, the user authorization level of the user and/or programmable device may be reduced due to non-proximity to the property for which the data was received 107. This reduction in the user authorization level may occur in instances where the geocoordinates, plus any error, received as part of the data appear to be too far away from the property identified by the property location identifier when that data is compared with other external data sources. The user and/or programmable device being too far away from the property in question may serve a basis for questioning the authenticity of the user, the authenticity of the device, and/or the trustworthiness of the data being submitted for incorporation into the database. The user authorization level may also be reduced for other reasons in which any one or more of the authenticity of the user, the authenticity of the device, and/or the trustworthiness of the data being submitted are called into question.

Figure 5:
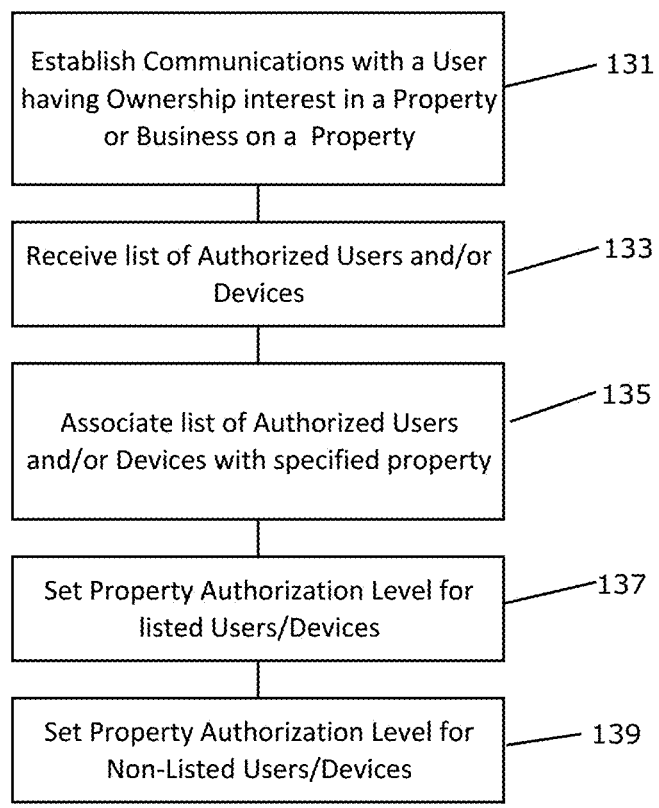
FIG. 5 is a flow chart showing a process for establishing an authorization level associated with a property.

A process for setting the property authorization level is shown in the flow chart of FIG. 5. Initially, communications are established 131 between the server and a user who has an ownership interest in the property or a business on the property. The ownership interest of the user may be determined by public records, through a trusted business partner, or through any other trusted source. Confirmation of the identity of the user may be made in person by an administrator of the server or a representative of the administrator, or it may be made through the mail, or by any other method desired. In order to maintain the integrity of the database maintained by the server, it is in the interest of those administering the server that the ownership interest of the user is appropriately verified.

With communications established, the user provides 133 a list of authorized users and/or programmable devices which are to be added to the property authorization level data. The user may identify the extent of access for each user and/or programmable device on the list for that property, so that the data-type each user and/or programmable device has permission to access and/or permission to modify is defined by the list. The list of users and/or programmable devices is then associated with the property 135, and the property authorization level is set 137 for the users and/or programmable devices included on the list and according to the list. Once the list has been incorporated into the property authorization level, then those data-types for which the list does not address may be set. This last step is the equivalent of setting the property authorization level for non-listed users and/or devices 139. The data types which the list does not address may be left null, or they may be completed in any manner desired by the user having the ownership interest.

Figure 6:
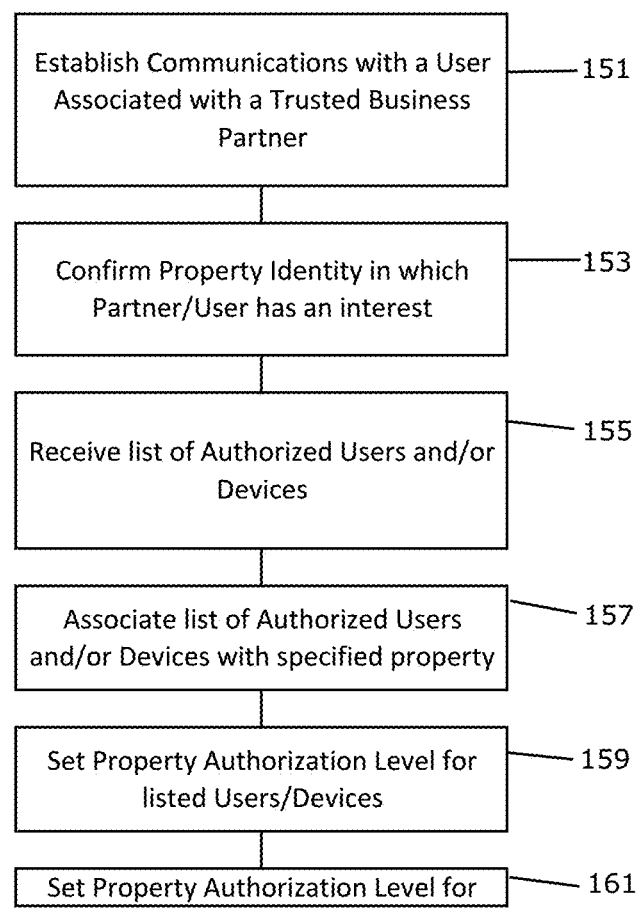
FIG. 6 is a flow chart showing an alternative process for establishing an authorization level associated with a property.

Another process for setting the property authorization level is shown in the flow chart of FIG. 6. In this process, communications are established with a user associated with a trusted business partner 151. In this instance, confirmation of the identity of the user is provided by the trusted business partner. With the user's identity confirmed, the user may confirm the identity of properties in which the user and/or the trusted business partner has an interest 153. The properties may be identified by street address, parcel number, or by any other appropriate identifier. In the case where a non-common identifier is submitted by the user, the server may correlate that non-common identifier with a more common property identifier, such as the street address or the parcel number.

With communications established 151 and the property identified 153, the user provides 155 a list of authorized users and/or programmable devices which are to be added to the property authorization level data. The user may identify the extent of access for each user and/or programmable device on the list for that property, so that the data-type each user and/or programmable device has permission to access and permission to modify is defined by the list. The list of users and/or programmable devices is then associated with the property 157, and the property authorization level is set 159 for the users and/or programmable devices included on the list and according to the list. Once the list has been incorporated into the property authorization level, then those data-types for which the list does not address may be set. This last step is, again, the equivalent of setting the property authorization level for non-listed users and/or devices 161. The data types which the list does not address may be left null, or they may be completed in any manner desired by the user having the ownership interest.

The process described in FIG. 6 may be most helpful to larger corporations that have many business locations and/or franchise locations. It allows a user at the corporate headquarters to assign different users and/or programmable devices with authorization to provide information to the server, thereby updating the database, about each individual location. With appropriate programming to the programmable device, this process may be made simple and straightforward, so that assigning tasks to local users, and updating the database, becomes an almost trivial process.

Figure 7:
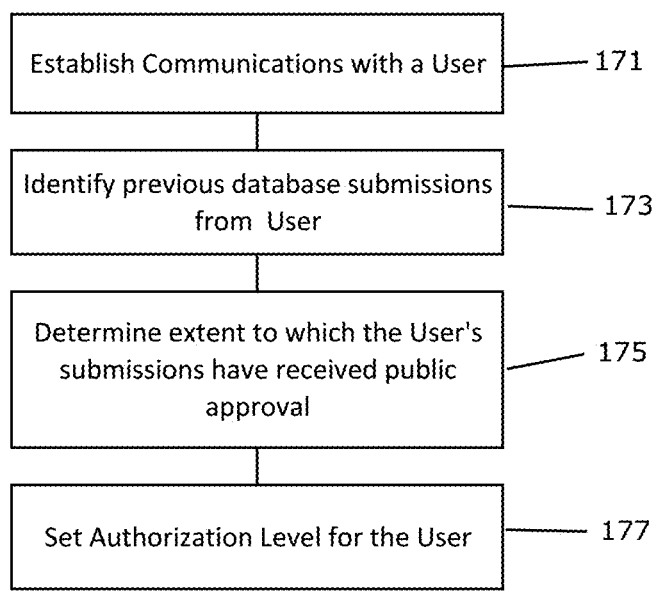
FIG. 7 is a flow chart showing a process for establishing an authorization level associated with a user.

A process for setting, increasing, or decreasing the user authorization level for a particular user is shown in the flowchart of FIG. 7. Communications are first established with a user 171. The server identifies any previous database submissions 173, particularly submissions that have actually been incorporated into the database, by that user. The server also determines the extent to which those previous submissions received public approval from other users 175. In other words, the server has received data from other public users which indicates that data submitted for incorporation into the database by the user in question is reliable or not reliable. Where the data submitted by the user in question has indicia of reliability from the public, that user may have their user authorization level increased 177, thereby enabling that user have submissions of other data types, such as geocoordinates, incorporated into the database. Alternatively, users who other members of the public adjudge to have submitted unreliable data in the past may have their user authorization level decreased.

By increasing the user authorization in this manner, the server is rewarding users who submit useful data, and penalizing users who do not. This is a common method by which crowd-sourced data is collected and authenticated by the public.

Figure 8:
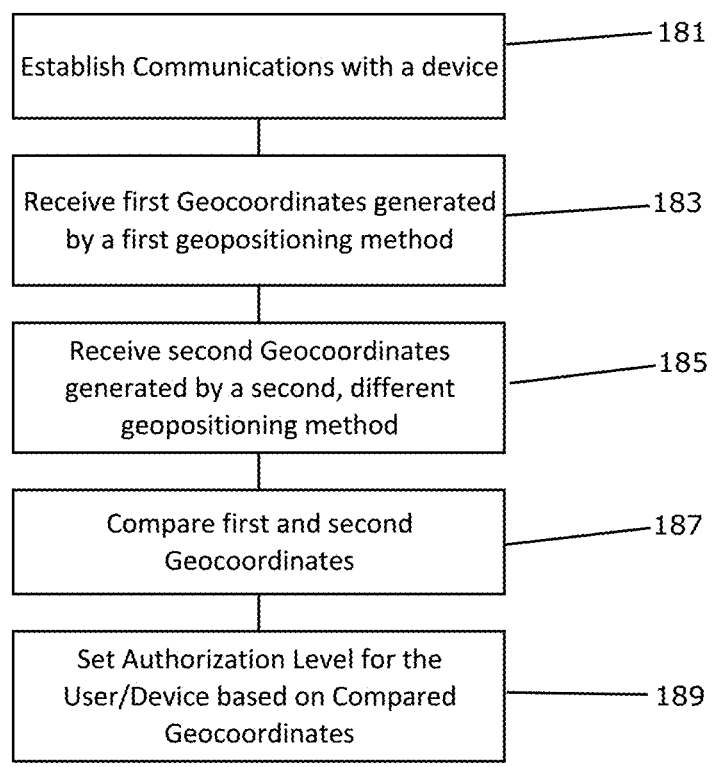
FIG. 8 is a flow chart showing a process for establishing an authorization level associated with a user.

Another process for setting, increasing, or decreasing the user authorization level for a particular user is shown in the flowchart of FIG. 8. Communications are first established with a programmable device 181, the user of which may be a new user or an existing user. The programmable device is configured to be able to locate a geoposition, and generate geocoordinates, using at least two different methods, which may include GPS, cell tower triangulation, Wi-Fi location, and the like. The server receives from the programmable device first geocoordinates generated by a first of the geo-positioning methods 183, and then the server receives from the programmable device second geocoordinates generated by a second of the geopositioning methods 185. The time between transmission of the first and second geocoordinates by the programmable device is a matter of design choice. The generation of the second geocoordinates may be triggered automatically by the programming of the device, or even in response to instructions communicated by the server. By having the second geocoordinates generated without active user interaction, the next step of comparing the first and second geocoordinates 187 may produce more reliable results for ensuring that the user, and the programmable device, are in fact in the location identified by the first geocoordinates. The user authorization level for the user and/or the programmable device may be set based on the results of the comparison 189. Where there is a substantial match or overlap between the first and second geocoordinates, then the user authorization level for the user and/or the programmable device may be maintained at its current level, or if appropriate when there are other indicia of trustworthiness of the user and/or programmable device, the user authorization level may be increased. The error transmitted with the geocoordinates may be taken into account when determining whether there is a substantial match. Alternatively, the requirements for establishing a substantial match may be predetermined by variables pre-programmed into the server. When there is not a substantial match between the first and second geocoordinates, the user authorization level for the user and/or programmable device may be decreased, as appropriate. The amount of increase or decrease of the user authorization level, and whether the user authorization level for the user, the device, or both are increased or decreased, are matters of design choice.

Figures 9D, 9E:
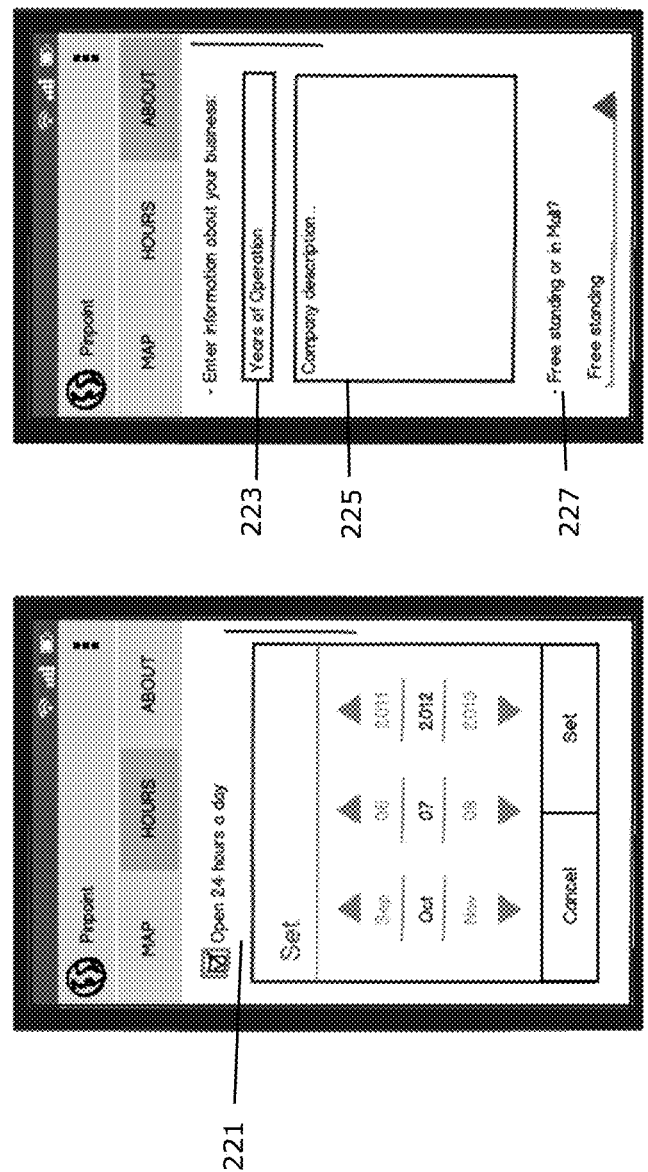

FIGS. 9A-9E illustrate one example of a user interface displayed by a programmable device that may be used to generate geocoordinates, associate those geocoordinates with a property location identifier, and associate location information with the geocoordinates. This user interface example is intended for use with a user and/or programmable device having a user authorization level which matches or exceeds the property authorization level of the property for which the information is being submitted to the server for incorporation into the database. As shown in FIG. 9A, a map 201 of the geographical vicinity of the location of the programmable device (and presumably, the user) is displayed, with a central point 203 showing the geoposition of the programmable device on the map 201. An estimate of the error in the geoposition is shown both numerically 205, and graphically as a fuzzy halo 207 around the central point. When the user is in the location they desire to mark with geocoordinates, the button 'Place Marker' is used to retrieve geocoordinates of the present location. The programmable device associates the geocoordinates with the property at the street address shown on the map, again with the presumption that the user and/or the programmable device has authorization to access and modify the data in the map database associated with that property. The interface then switches to display FIG. 9B, where the user can insert a name for the geocoordinates in the 'Name of new Marker' field 209 and a description for the location in the 'Short description' field 211. This display also includes a camera icon 213, which will switch the programmable device into camera mode and allow the user to take a photograph of a view from the location, or alternatively, to move away from the location a short distance and take a photograph of the location itself. Once the user is satisfied with the information entered, the 'Set' button is used to proceed to the next interface display, which is FIG. 9C. On this display, the user is presented with the map again, this time with a flag 215 showing where the geocoordinates will place the geoposition on the map. The user may also select the 'HOURS' button 217 and 'ABOUT' button 219 to add additional information to the location information associated with the geocoordinates. FIG. 9D shows an interface display which presents an hours of operation field 221 so that the user may indicate the hours of operation for the business located at the geocoordinates, and FIG. 9E shows an interface display with which the user may enter additional information about the business located at, and therefore associated with, the geocoordinates. In the embodiment shown, the interface display has a years of operation field 223, a company description field 225, and a field 227 to mark whether the business in a free-standing building or if it is part of a mall. The company description field may have any information entered into it as desired by the user, such as more complete description of the goods and/or services offered, specific brands offered, and just about anything.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of compiling map data, the method comprising:
   communicating, using a server, with a remote programmable device operable by a user;
   receiving, at the server and from the device, an authorization request including user authentication information;
   comparing, by the server, the authorization request received from the device with authorization data to determine a user authorization level based on the user authentication information;

receiving, at the server and from the device, first geocoordinates, a first property location identifier, and a first location description, wherein the first geocoordinates locate a geoposition on or near a property identified by the first property location identifier; and incorporating, by the server, one or more of the first geocoordinates, the first property location identifier, and the first location description into a database comprising a plurality of geocoordinates, when the determined user authorization level matches or exceeds a property authorization level, wherein the property authorization level is separate and distinct from the user authorization level and includes at least three different levels of access.

2. The method of claim 1 wherein one of the at least three levels of access provides no access.

3. The method of claim 1 further comprising transmitting the first geocoordinates, the first property location identifier, and the first location description upon receipt of a query, the query returning query results based on at least one of the first geocoordinates, the first property location identifier, and the first location description.

4. The method of claim 1 wherein the first geocoordinates locate a geoposition of one of a location within a building, a boundary of property, a building entrance, and a real property fixture.

5. The method of claim 1 wherein the first property location identifier comprises one of a street address for real property or a parcel number for real property.

6. The method of claim 1 further comprising receiving, at the server and from the device, a geocoordinate error associated with the first geocoordinates.

7. The method of claim 1 wherein the authorization request comprises at least one of a phone number of the device, a unique identification number associated with the device, and a user identifier and a user password.

8. The method of claim 1 further comprising:
receiving, at the server, triangulation coordinates generated by the device, the triangulation coordinates being based upon a location of the device; and
comparing, by the server, the first geocoordinates with the triangulation coordinates to determine a proximity of the device to the property.

9. The method of claim 8 further comprising adjusting, by the server, the authorization level based on the proximity of the device to the property.

10. The method of claim 1 further comprising:
comparing, by the server, the first geocoordinates with known geocoordinates for the property to determine a proximity of the device to the property; and
adjusting, by the server, the authorization level based on the proximity of the device to the property.

11. The method of claim 1, wherein the incorporating of the one or more of the first geocoordinates occurs where:
the user authorization level of the user is a first user authorization level, the first user authorization level allowing modification of geocoordinates data; and
the property authorization level of the property allows modification of the geocoordinates data by users having the first user authorization level.

12. A network comprising:
a remote programmable device for operation by a user; and
at least one server configured to execute non-transitory computer executable code, the code instructing the server to:

receive from the device an authorization request including user authentication information;
compare, by the server, the authorization request received from the device with authorization data maintained by the server to determine a user authorization level based on the user authentication information;
receive from the device first geocoordinates, a first property location identifier, and a first location description, wherein the first geocoordinates locate a geoposition on or near a property identified by the first property location identifier; and
incorporate one or more of the first geocoordinates, the first property location identifier, and the first location description into a database comprising a plurality of geocoordinates, when the determined user authorization level matches or exceeds a property authorization level, wherein the property authorization level is separate and distinct from the user authorization level and includes at least three different levels of access.

13. The network of claim 12 wherein one of the at least three levels of access provides no access.

14. The network of claim 12 wherein the first geocoordinates locate a geoposition of one of a location within a building, a boundary of property, a building entrance, and a real property fixture.

15. The network of claim 12 wherein the first property location identifier comprises one of a street address for real property or a parcel number for real property.

16. The network of claim 12 the code further instructing the server to receive from the device a geocoordinate error associated with the first geocoordinates.

17. The network of claim 12 wherein the authorization request comprises at least one of a phone number of the device, a unique identification number associated with the device, and a user identifier and a user password.

18. The network of claim 12 the code further instructing the server to:
receive triangulation coordinates generated by the device, the triangulation coordinates being based upon a location of the device; and
compare the first geocoordinates with the triangulation coordinates to determine a proximity of the device to the property.

19. The network of claim 18 the code further instructing the server to adjust the authorization level based on the proximity of the device to the property.

20. A method of compiling map data, the method comprising:
receiving, at the server and from a remote programmable device, an authorization request including user authentication information;
determining, at the server, a user authorization level based on the user authentication information;
receiving, at the server and from the device, first geocoordinates, a first property location identifier, and a first location description, wherein the first geocoordinates locate a geoposition on or near a property identified by the first property location identifier; and
incorporating, by the server, one or more of the first geocoordinates, the first property location identifier, and the first location description into a database comprising a plurality of geocoordinates, when the determined user authorization level matches or exceeds a property authorization level, wherein the property authorization level is separate and distinct from the user authorization level and includes at least three different levels of access.

* * * * *